United States Patent
Tsatsanis et al.

(10) Patent No.: US 9,154,338 B1
(45) Date of Patent: Oct. 6, 2015

(54) SYSTEM AND METHOD FOR IQ IMBALANCE ESTIMATION

(71) Applicant: Entropic Communications, LLC, Carlsbad, CA (US)

(72) Inventors: Michail Tsatsanis, Huntington Beach, CA (US); Na Chen, San Diego, CA (US)

(73) Assignee: Entropic Communications, LLC, Carlsbad, CA (US)

( * ) Notice: Subject to any disclaimer, the term of this patent is extended or adjusted under 35 U.S.C. 154(b) by 0 days.

(21) Appl. No.: 14/321,208

(22) Filed: Jul. 1, 2014

Related U.S. Application Data

(60) Provisional application No. 61/981,633, filed on Apr. 18, 2014.

(51) Int. Cl.
*H04B 3/46* (2015.01)
*H04L 25/02* (2006.01)
*H04L 27/38* (2006.01)

(52) U.S. Cl.
CPC ........ *H04L 25/0228* (2013.01); *H04L 27/3863* (2013.01)

(58) Field of Classification Search
USPC ......... 375/224, 227–228, 295, 316, 340, 346, 375/350
See application file for complete search history.

(56) References Cited

U.S. PATENT DOCUMENTS

| | | | |
|---|---|---|---|
| 8,379,767 B2 * | 2/2013 | Zhu | 375/322 |
| 8,437,430 B2 * | 5/2013 | Guo et al. | 375/319 |
| 2008/0130779 A1 * | 6/2008 | Levi et al. | 375/267 |
| 2009/0325516 A1 * | 12/2009 | Safavi | 455/126 |
| 2011/0069744 A1 * | 3/2011 | Laudel et al. | 375/219 |
| 2011/0150112 A1 * | 6/2011 | Guo et al. | 375/260 |

* cited by examiner

*Primary Examiner* — Khanh C Tran
(74) *Attorney, Agent, or Firm* — McAndrews, Held & Malloy

(57) ABSTRACT

Systems and methods for estimating IQ imbalance in a communication system are provided, where a first device is configured to perform a self-characterization. The self-characterization is performed by requesting an IQ probe from a second device. The first device receives tones via the IQ probe with frequency separation such that an image related to one IQ imbalance is separated from an image related to another IQ imbalance. IQ imbalance can be estimated by calculating tone to image ratio.

21 Claims, 12 Drawing Sheets

SYSTEM AND METHOD FOR IQ IMBALANCE ESTIMATION

CROSS-REFERENCE TO RELATED APPLICATIONS

This application claims the benefit of U.S. Provisional Application Ser. No. 61/981,633, filed Apr. 18, 2014, which is incorporated herein by reference in its entirety.

TECHNICAL FIELD

The present disclosure relates generally to communication systems. In particular, some embodiments provide systems and methods for estimating IQ imbalance in communications systems.

BACKGROUND

Designers of contemporary communications devices face numerous challenges. Such challenges arise from a continued increase in the levels of semiconductor device integration in addition to constantly striving to reduce power consumption, size, and cost, while increasing capabilities. Wired and wireless communication devices are no exception. In traditional broadcast systems where one device is broadcasting to many receivers, it is possible, and often practical, to design the broadcasting system to more rigorous specifications. However, in a distributed network or other like environment, it is not always practical from a commercial standpoint to design each of the devices in accordance with the highest standards. Accordingly, in contemporary communication devices, a low-cost, practical implementation of the physical layer presents a unique challenge in view of variations associated with device componentry.

One such challenge involves the imbalance that typically occurs between the in-phase (I) and quadrature-phase (Q) branches when a received radio frequency (RF) signal is down-converted to baseband. Similarly, at a transmitter, IQ imbalance can be introduced during frequency up-conversion from baseband to RE. IQ imbalance can be the result of "amplitude," "phase," and "delay" mismatch between the I and Q branches in quadrature heterodyne communications. Particularly, in typical communication systems, the gain (amplitude) and phase responses of the I and Q branches can be different from one another, resulting in signal distortion. The IQ imbalances can limit the achievable operating signal-to-noise ratio (SNR) at the receiver, which can adversely impact constellation sizes and data rates. This imbalance can occur with both heterodyne receivers as well as with the so-called zero-IF, or direct-conversion receivers. Although a direct conversion receiver is preferable for low-cost and power-sensitive applications, it tends to be more sensitive to IQ imbalance. With IQ imbalances, translated spectral components from both the desired frequency bin and the associated "image" frequency bin come into play, although the former usually dominate.

SUMMARY

Various embodiments are directed to estimating IQ imbalance in a communication system are provided, where a first device is configured to perform a self-characterization. The self-characterization is performed by requesting an IQ probe from a second device. The first device receives tones via the IQ probe with frequency separation such that an image related to one IQ imbalance is separated from an image related to another IQ imbalance. The one IQ imbalance may be generated from the transmitter circuitry and the another IQ imbalance may be generated from the receiver circuitry. IQ imbalance can be estimated by calculating tone to image ratio.

In accordance with one embodiment, a method comprises requesting an IQ probe for transmitting tones. The method further comprises receiving the tones with a frequency separation. Additionally, the method comprises calculating an estimate of the IQ imbalance for each received tone.

In accordance with another embodiment, a communication device comprises a memory configured to store instructions, and a processor, operatively coupled to the memory and configured to execute instructions. The instructions cause the processor to request an IQ probe for transmitting tones. The instructions further cause the processor to receive the tones with a frequency separation. Moreover, the instructions cause the processor to calculate an estimate of the IQ imbalance for each received tone.

Other features and aspects of the disclosed method and apparatus will become apparent from the following detailed description, taken in conjunction with the accompanying drawings, which illustrate, by way of example, the features in accordance with embodiments of the disclosed method and apparatus. The summary is not intended to limit the scope of the invention, which is defined solely by the claims attached hereto.

BRIEF DESCRIPTION OF THE DRAWINGS

Various embodiments are described in detail with reference to the following figures. The drawings are provided for purposes of illustration only and merely depict typical or example embodiments. These drawings are provided to facilitate the reader's understanding and shall not be considered limiting the breadth, scope, or applicability of the present disclosure. It should be noted that for clarity and ease of illustration these drawings are not necessarily made to scale.

The figures are not intended to be exhaustive or to limit the various embodiments to the precise form disclosed. It should be understood that embodiments can be practiced with modification and alteration.

DETAILED DESCRIPTION OF VARIOUS EMBODIMENTS

Various embodiments are directed toward systems and methods for estimating IQ imbalance in a communication system. In accordance with various embodiments, a device (having a receiver and a transmitter) is configured to perform a self-characterization. The device can request that a probe be transmitted from another device. The receiver of the requesting device can receive the transmitted probe with a certain amount of frequency separation and calculate an image to tone ratio to estimate IQ imbalance.

In various embodiments, the receipt of the transmitted probe with frequency separation at the requesting device allows for an image related to one IQ imbalance (for example, from the transmitter circuit) to be separated from an image related to another IQ imbalance (for example, from the receiver circuit). In some embodiments, the frequency separation comprises, for example 10 bins, 20 bins or more. For example, some embodiments may use 64 bins. In general, the number of bins should be large enough so that the images and tones do not interfere in each computation. An integer number of frequency bins is preferable for OFDM (Orthogonal Frequency Division Multiplexing) systems to keep the images orthogonal to the received tones. Other frequency separations are also possible, depending on the particular implementation.

The imbalance estimate can include a gain imbalance, a phase imbalance or a delay imbalance. Additionally, in various embodiments, the imbalance estimate includes transmitter IQ imbalance estimation or receiver IQ imbalance estimation.

Figure 1:
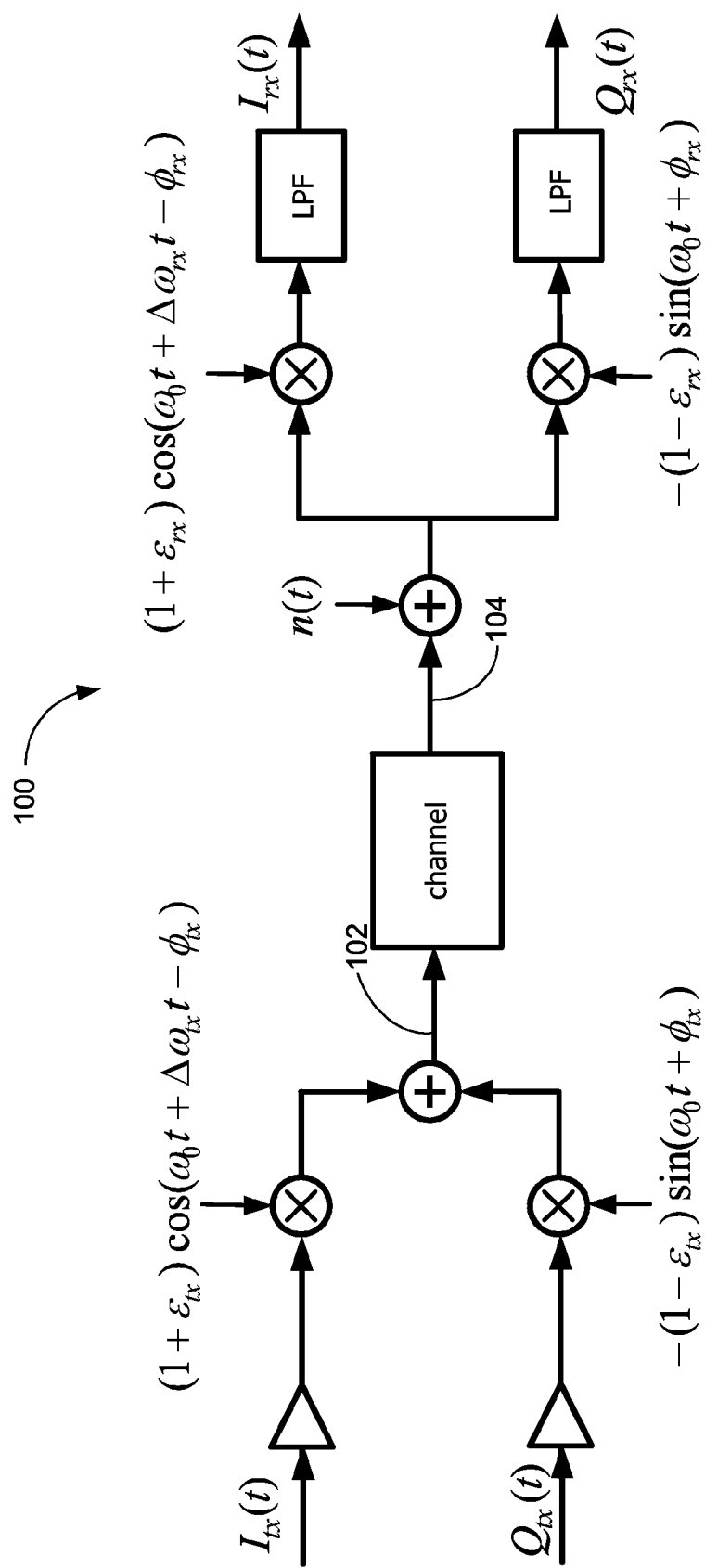
FIG. 1 is a diagram illustrating an example time-domain model with both transmit and receive included.

FIG. 1 is a diagram illustrating an example time-domain model 100 with both transmit and receive included. Referring now to FIG. 1, for a system to have no IQ imbalance, the effective sine and cosine waveforms performing up-conversion and down-conversion need to be orthogonal, i.e., having a 90° phase difference and the same amplitude. In addition, the time delay and gain that each branch experiences should be equal. However, because these waveforms are never exactly orthogonal and the time delay and gain are never exactly equal, real-world systems will have some form of IQ imbalance. These IQ imbalances can be modeled as illustrated in FIG. 1.

In the absence of transmit-receive (Tx-Rx) frequency offset, the baseband equivalent model of the output of the transmit up-conversion imbalance model 102 can be modeled as $p(t) = \mu_{tx} x(t) + v_{tx} x^*(t)$ where $\mu_{tx} = [\cos(\phi_{tx}) - j\epsilon_{tx} \sin(\phi_{tx})]$ and $v_{tx} = [\epsilon_{tx} \cos(\phi_{tx}) - j \sin(\phi_{tx})]$ while the output of the receive down-conversion imbalance model 104 can be modeled as $z(t) = \mu_{rx} y(t) + v_{rx} y^*(t)$ where $\mu_{rx} = [\cos(\phi_{rx}) + j\epsilon_{rx} \sin(\phi_{rx})]$ and $v_{rx} = [\epsilon_{rx} \cos(\phi_{rx}) - j \sin(\phi_{rx})]$. From this, and taking into account the effect of frequency offset, it can be shown that when an input b(t) is input into the time domain imbalance model 100 the output can be modeled as $$b'_{rx-tx}(t) = \mu_{rx} C_k \mu_{tx} e^{j\Delta\omega t} e^{j\omega_k t} + \mu_{rx} C_{-k} v_{tx} e^{j\Delta\omega t} e^{-j\omega_k t} + v_{rx} C_k^* \mu_{tx}^* e^{-j\Delta\omega t} e^{-j\omega_k t} + v_{rx} C_{-k}^* v_{tx}^* e^{-j\Delta\omega t} e^{j\omega_k t}.$$

The tone frequency components are made up of two signals, a signal with a gain of $\mu_{rx} C_k \mu_{tx}$ shifted upward by the value of $\Delta\omega = \Delta\omega_{tx} - \Delta\omega_{rx}$ and a signal with a gain of $v_{rx} C_{-k}^* v_{tx}^*$ shifted downward by the value of $\Delta\omega = \Delta\omega_{tx} - \Delta\omega_{rx}$. The image frequency components are also made up of two signals, a signal with a gain of $\mu_{rx} C_{-k} v_{tx}$ upward shifted by the value of $\Delta\omega = \Delta\omega_{tx} - \Delta\omega_{rx}$ and a signal with a gain of $v_{rx} C_k^* \mu_{tx}^*$ downward shifted by the value of $\Delta\omega = \Delta\omega_{tx} - \Delta\omega_{rx}$. These signals are illustrated in FIG. 2.

Figure 2:
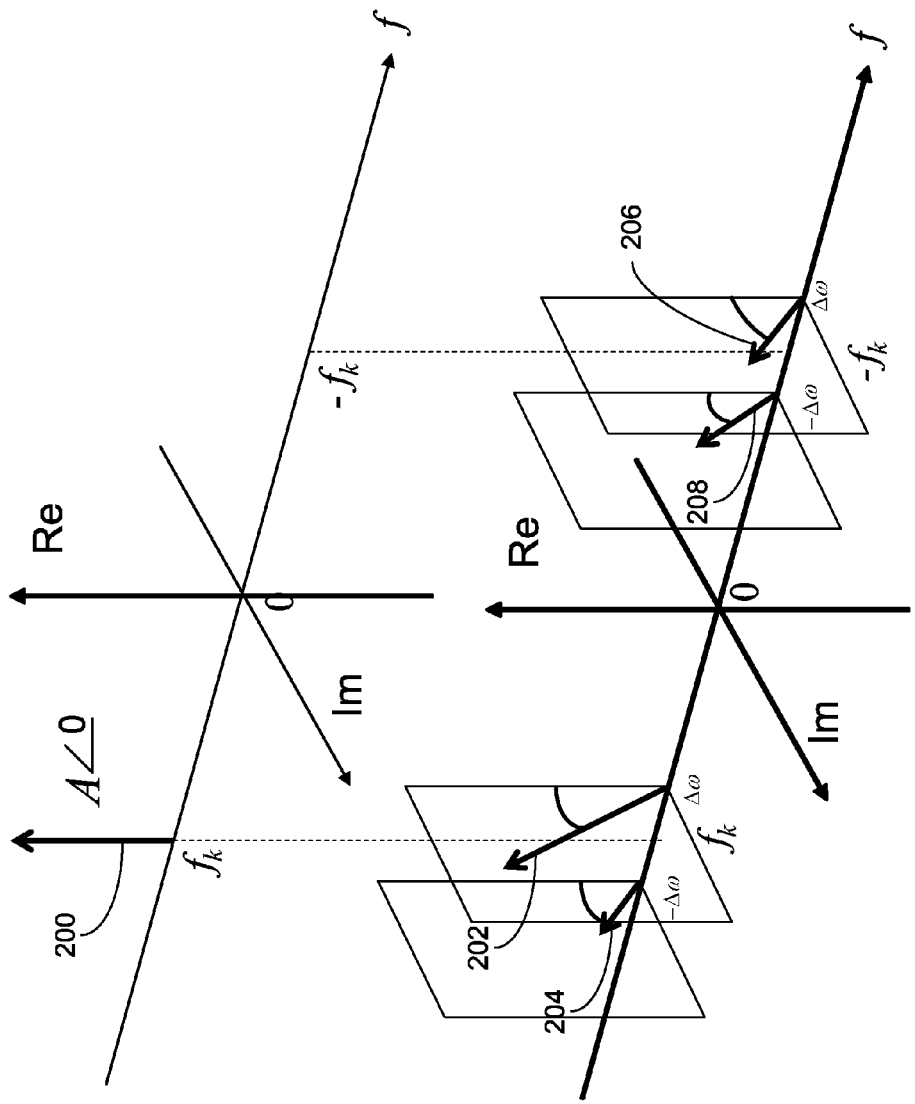
FIG. 2 is a diagram illustrating an example of the effect of transmit-receive IQ imbalance on a single tone.

FIG. 2 is a diagram illustrating an example of the effect of Tx-Rx IQ imbalance on a single tone. Referring now to FIG. 2, when a signal 200 is transmitted using a system conforming to the time-domain imbalance model 100 illustrated in FIG. 1, four signals will be received. As discussed above, a signal 202 with gain of $\mu_{rx} C_k \mu_{tx}$ upward shifted by the value of $\Delta\omega = \Delta\omega_{tx} - \Delta\omega_{rx}$ and a signal 204 with gain of $v_{rx} C_{-k}^* v_{tx}^*$ downward shifted by the value of $\Delta\omega = \Delta\omega_{tx} - \Delta\omega_{rx}$ will be present. Additionally, a signal 206 with gain of $\mu_{rx} C_{-k} v_{tx}$ upward shifted by the value of $\Delta\omega = \Delta\omega_{tx} - \Delta\omega_{rx}$ and a signal 208 with gain of $v_{rx} C_k^* \mu_{tx}^*$ downward shifted by the value of $\Delta\omega = \Delta\omega_{tx} - \Delta\omega_{rx}$ will also be present.

The channel gain $C_k$ and the $\mu$ terms are generally close to 1. The product of these terms is also generally near 1. Accordingly, the signal gain is close to 1, but not equal to 1. A frequency offset, $\Delta\omega$, caused by the IQ imbalance is also present.

Certain conventional IQ algorithms use loopback probes with a small number of tones. IQ imbalance is estimated by the ratio of the tone to IQ image measured. That is, the Tx and Rx images are separated or offset in frequency. That is, the Tx synthesizer and the Rx synthesizer for a device are offset by, e.g., 12.5 MHz so that the Tx and Rx images can be separated.

In a conventional loopback system the channel gain, $C_k$, will generally be close enough to 1 to be treated as equal to 1. Accordingly, a conventional loopback system with input b(t) can be modeled as:

$$b'_{rx-tx}(t) = \mu_{rx} \mu_{tx} e^{j\Delta\omega t} e^{j\omega_k t} + \mu_{rx} v_{tx} e^{j\Delta\omega t} e^{-j\omega_k t} + v_{rx} \mu_{tx}^* e^{-j\Delta\omega t} e^{-j\omega_k t} + v_{rx} v_{tx}^* e^{-j\Delta\omega t} e^{j\omega_k t}.$$

The gain, phase and delay IQ imbalance can be calculated using these parameters.

However, conventional loopback systems suffer the drawback of requiring the transmitter and receiver of a device to tune to different frequencies at the same time to support the aforementioned frequency offset. That is, two or more programmable synthesizers (which include Phase Locked Loops and Voltage Controlled Oscillators) are required in a device. This can lead to significant cost increases. In general, a radio tunes to a single channel at a time and is typically designed with a single synthesizer. The cost of the second synthesizer is incurred solely for the purpose of providing the loopback-with-frequency offset capability required by these conventional IQ imbalance calibration techniques. Other approaches like manual tuning can also be cost prohibitive when mass producing devices, such as radios made on silicon.

Accordingly, various embodiments are provided for estimating IQ imbalance by requesting a probe from a remote device. Thus, a loopback system need not be implemented on a device, and the need for multiple phase-locked loops is negated. Instead, an Rx node may shift its Rx synthesizer by some specified amount (as will be described in greater detail below) in order to achieve the aforementioned frequency separation. It is contemplated herein that various embodiments can be used to determine the gain, phase, and delay IQ imbalance caused by real-world systems.

Various IQ tuning probes are contemplated for use in accordance with various embodiments. A first probe, which can be referred to as an RxIQ50 probe, may comprise a remote transmitter to receiver probe that is a Multimedia over Coax Alliance (MoCA) Standard 1.0-defined Type II probe. This probe is utilized for calibration of the receive path IQ of the device under self-calibration. This first probe is preceded by an error vector magnitude (EVM) probe for the purposes of obtaining automatic gain control (AGC), frequency offset, and channel signal-to-noise ratio (SNR) estimates. Receiver configuration with the correct gain/frequency offset etc. is a consideration for the practical implementation of this technique, and the use of EVM probes is one way of achieving correct receiver configuration.

After the receive path IQ imbalance has been calibrated, a second probe, which can be referred to as a TxIQ50 probe is used to calibrate the IQ imbalance of the transmit path of the device under self-calibration. This probe may be a loopback probe with no frequency offset. This probe is preceded by the RxIQ50 probe (and receive path IQ calibration) as the lack of dual synthesizers may cause Tx images and Rx images to appear at the same frequency. This probe is also preceded by RF calibration to ensure unity gain through the low-power loopback path.

In some communications standards, systems may be configured to utilize different communication channel bandwidths. For example, in the MoCA standard, systems can use either 50 MHz or 100 MHz channel bandwidth. In this case, the IQ calibration procedure may have to be repeated independently for the 50 MHz configuration and the 100 MHz configuration.

After the 50 MHz configuration has been IQ calibrated, a third probe, which can be referred to as an RxIQ100 probe, may again be a remote transmitter to receiver probe preceded by an EVM probe for the purposes of obtaining AGC, frequency offset, and channel signal-to-noise ratio estimates. This third probe is also preceded by RF calibration to ensure unity gain through the low-power loopback path. A fourth probe, which can be referred to as a TxIQ100 probe, can be a low-power loopback probe preceded by the RxIQ100 probe as again, the lack of dual synthesizers in certain scenarios may cause Tx images and Rx images to appear at the same frequency.

Figure 3:
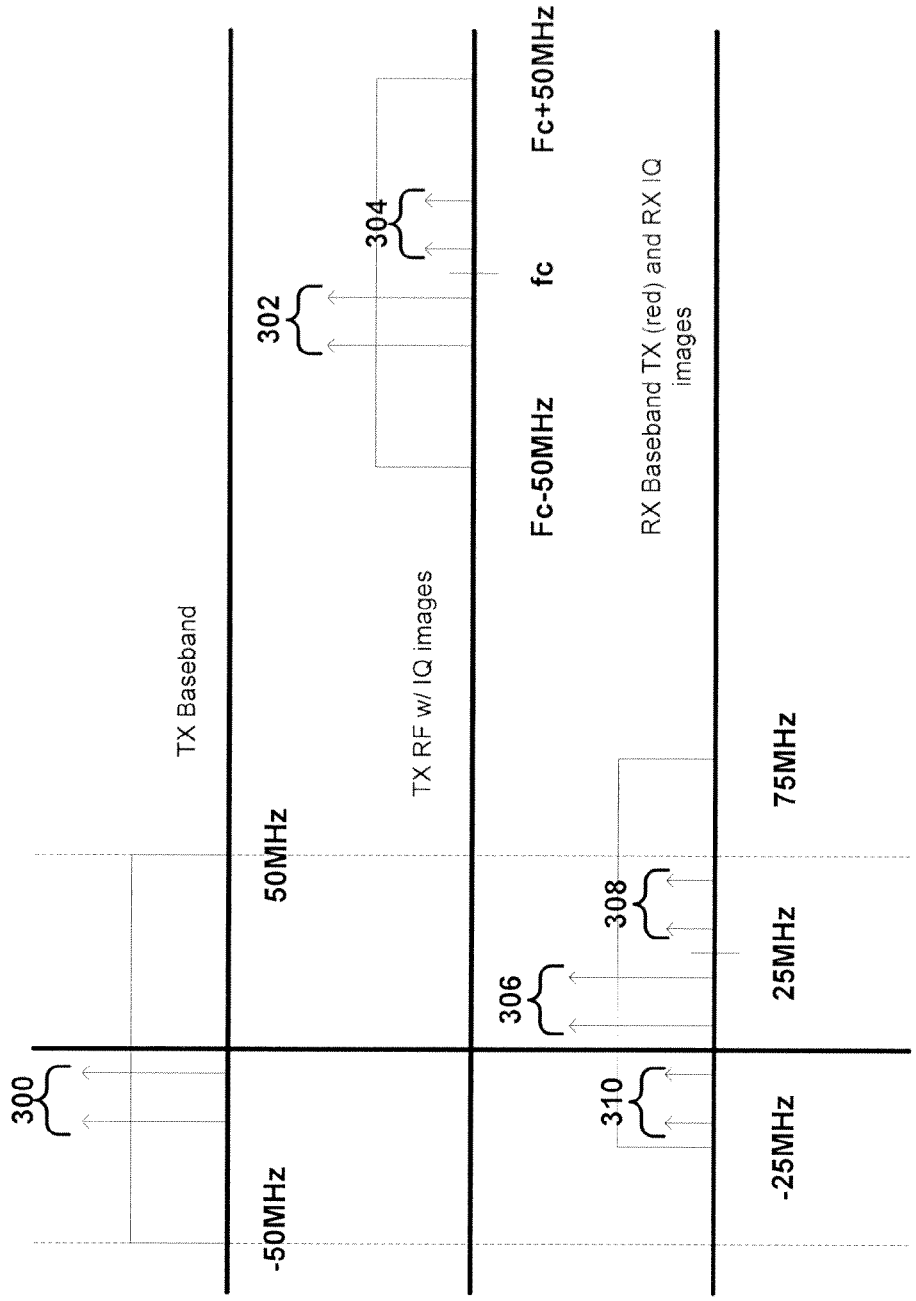
FIG. 3 is a diagram illustrating an example IQ image frequency separation for estimating IQ imbalance in accordance with various embodiments.

FIG. 3 illustrates an example of frequency separation for separating the image related to a first IQ imbalance (e.g., Tx IQ image) from an image related to another IQ imbalance (e.g., Rx IQ image). During admission of a new node to a network, e.g., a MoCA network, the new node may request an IQ probe with e.g., two or four tones located in the [−25, 0] MHz band. In this example, two tones 300 are transmitted. It should be noted that if the new node is the first node to be admitted to the network, a Network Controller (NC) may repeat IQ estimation as described herein, as this may be the NC's first opportunity to calibrate its IQ. When tones 300 are transmitted from a remote/far node (e.g., the transmitter of another radio device), the tones 300 are up-converted from baseband for modulating a higher frequency carrier signal, $f_c$, for transmission. This results in tones 302, where Tx IQ images 304 are generated at the respective symmetric frequencies.

At a receiver of the requesting device (the device requesting transmission of the IQ probe), a shift of, for example, 25 MHz is programmed at the Rx synthesizer as illustrated in FIG. 3. That is, and for example, tones 302 and Tx IQ images 304 are down-converted back to baseband plus 25 MHz, resulting in tones 306 and Tx IQ images 308. As a result, tones 302 and Tx IQ images 304 are down-converted to 25 MHz above baseband, and Rx IQ images 310 images are separated in frequency from Tx IQ images 308.

It should be noted that restriction of the tones in [−25, 0] MHz can be relaxed to [−50, +25] MHz of the transmitter band (or [−25, +50] MHz of the receiver band) as long as the frequencies are chosen judiciously, so that the Tx and Rx IQ images do not interfere with each other. Furthermore, if interference does exist in certain areas of the frequency band (e.g., as may be the case in Advanced Television Systems Committee (ATSC) or Global System for Mobile Communications (GSM)), the IQ probe tone frequencies can be chosen to avoid the interference.

Figure 4:
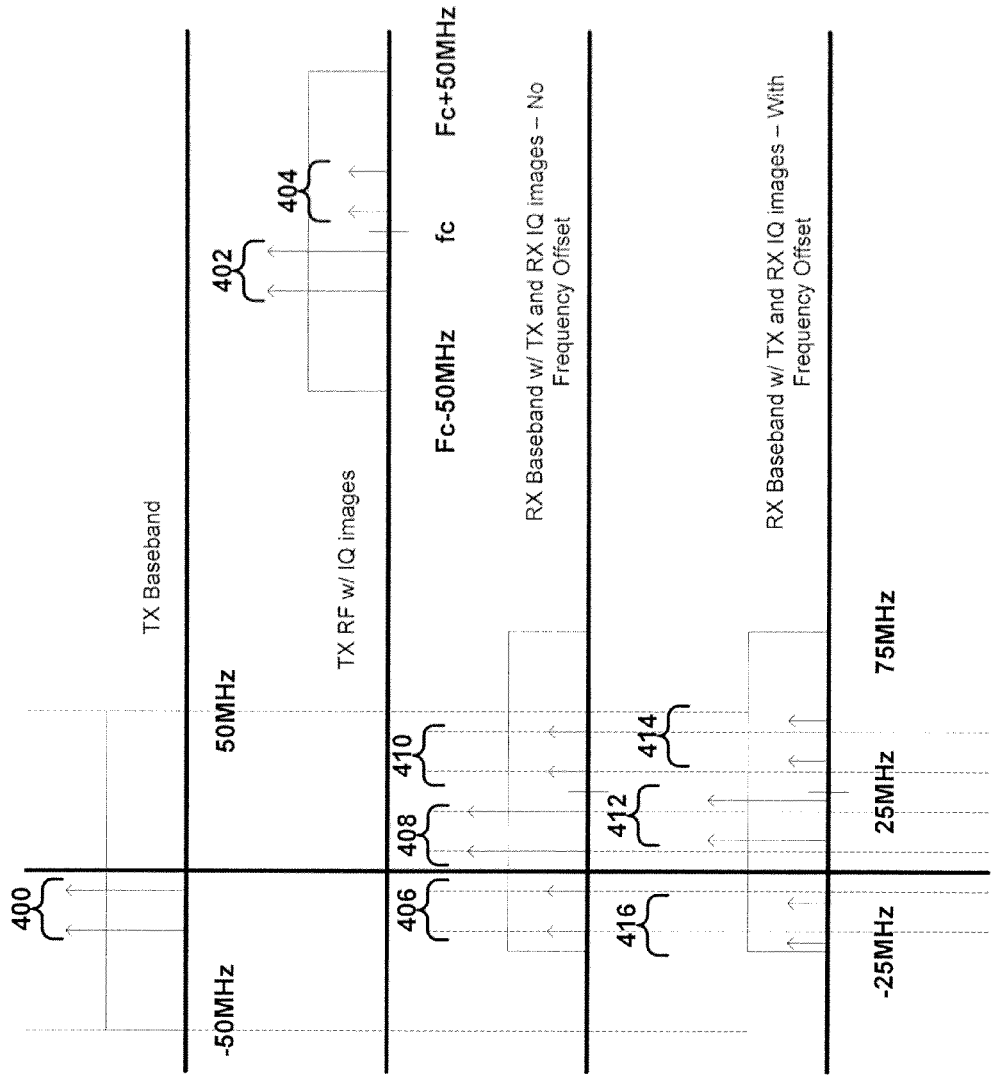
FIG. 4 is a diagram illustrating an example IQ image frequency separation in addition to frequency offset for estimating IQ imbalance in accordance with various embodiments.

In accordance with another embodiment, small frequency offset between a transmitter and a receiver due to crystal variations can be accounted for. That is, during admission of a new node to a network, e.g., a MoCA network, the new node may request an IQ probe with e.g., two or four tones located in the [−25, 0] MHz band. In this example, as illustrated in FIG. 4, two tones 400 are transmitted. It should be noted that if the new node is the first node to be admitted to the network, a network controller (NC) may repeat IQ estimation as described herein, as this may be the NC's first opportunity to calibrate its IQ. When tones 400 are transmitted from a remote/far node (e.g., the transmitter of another radio device), the tones 400 are up-converted from baseband for modulating a higher frequency carrier signal, $f_c$, for transmission. This results in tones 402, where Tx IQ images 404 are generated at the respective symmetric frequencies.

At a receiver of the requesting device (the device requesting transmission of the IQ probe), a shift of, e.g., 25 MHz, is programmed at the Rx synthesizer as illustrated in FIG. 4. That is, and for example, tones 402 and 404 are down-converted back to baseband plus 25 MHz. As a result, tones 402 and 404 are down converted to 25 MHz above baseband, resulting in tones 406 and 408, with and Rx IQ images 410 images being separated in frequency from Tx IQ images 408.

As illustrated in FIG. 4, the transmitted tones are still identical to the tones and images at mirror frequencies. A receiver mixer, however, may have a frequency offset to the transmitter frequency (in addition to the "bulk" 25 MHz separation) due to natural variation between the crystal of the transmitter and the crystal of the receiver. Accordingly, the tones and TX IQ images 412 and 414 will be shifted (to the right in FIG. 4) compared to the previous non-offset scenario. Therefore Rx IQ images 416 generated in this example are shifted in a direction opposite to Rx IQ images 414 (to the left in FIG. 4).

The shifting of transmitted tones and Tx IQ images are inconsequential with respect to IQ imbalance estimation, while Rx IQ images 416 remain at the mirror frequencies of received tones 412. Hence, there is the additional consideration that the received tones 412 (and Rx IQ images 416) may have shifted out of the Fast Fourier Transform (FFT) grid. This can introduce two issues, both of which stem from the associated FFT leakage. That is, the phase of each tone (or the nearest bin to the tone) is not constant in successive orthogonal frequency division multiplexing (OFDM) symbols.

Therefore, any coherent averaging done to improve SNR is no longer possible. Additionally, leakage from the tone may mask a weak image signal.

To address the above noted issues, the image to tone ratio is used for averaging, where the phase of the tone and the image should cancel out. Additionally, windowing may be utilized to account for the aforementioned leakage issue. That is, a window length may be chosen such that a null is located at an image point. Hence, the image may be positioned at a null of leakage sidelobes, thereby reducing interference. It should be noted that other methods of addressing frequency offset may be utilized in accordance with other embodiments, such as by increasing tone-to-image distance.

In particular, and assuming an expected tone at frequency bin k, that tone may be received at a frequency between two bins (more precisely at frequency $$\frac{2\pi(k+\delta)}{N}F_S$$

where N=512 is the size of the FFT (for MoCA 2.0), $F_s$=100 MHz is the sampling rate (for MoCA 2.0), and 0<δ<0.5 is a fractional bin frequency offset due to frequency offset between the transmitter and the receiver. Accordingly, the received signal is $$x(n) = Ae^{j\left(\frac{2\pi(k+\delta)n}{N}+\theta\right)} + \alpha Ae^{-j\left(\frac{2\pi(k+\delta)n}{N}+\theta\right)},$$

0≤n≤N−1 (1) where the second term is due to IQ imbalance and $\alpha=\rho e^{j\phi}$ is the IQ imbalance coefficient to be estimated.

Assuming that the frequency offset δ is known, the following frequency offset correction operation may be applied, $$\tilde{x}(n) = x(n)Ae^{-j\left(\frac{2\pi\delta n}{N}+\theta\right)} = Ae^{j\left(\frac{2\pi kn}{N}+\theta\right)} + \alpha Ae^{-j\left(\frac{2\pi(k+2\delta)n}{N}+\theta\right)}. \quad (2)$$

This operation centers the tone back on the grid but pushes the image to a frequency offset of 2δ.

Taking the FFT of the signal of (2) the following is obtained at bin k, $$X(k) = \sum_{n=0}^{N-1}\tilde{x}(n)e^{-j\frac{2\pi kn}{N}} = NAe^{-j\theta} + \alpha Ae^{-j\theta}\sum_{n=0}^{N-1}e^{-j\left(\frac{2\pi(2k+2\delta)n}{N}\right)}. \quad (3)$$

The first term in (3) is the FF of the tone (which now is on grid) and the second term is the leakage onto the tone bin from the image. This is a second order effect and may be ignored here, arriving at X(k)≅N (4).

The FFT at bin −k is $$X(-k) = \sum_{n=0}^{N-1}\tilde{x}(n)e^{j\frac{2\pi kn}{N}} = Ae^{-j\theta}\sum_{n=0}^{N-1}e^{j\frac{2\pi 2kn}{N}} + \alpha Ae^{-j\theta}\sum_{n=0}^{N-1}e^{-j\left(\frac{2\pi(2\delta)n}{N}\right)}. \quad (5)$$

The first term in (5) is identically equal to zero (i.e., no leakage from the tone, since the tone in on grid) and the second term in the FFT of the image. However, since the image is off grid, it is multiplied by the summation of exponentials constituting the sine function, thereby arriving at $X(-k)=\alpha Ae^{-j\theta}D$ (6) with a distortion factor, $$D = \sum_{n=0}^{N-1}e^{-j\left(\frac{2\pi(2\delta)n}{N}\right)}. \quad (7)$$

The ratio of (4) and (7) results in $$\frac{X(-k)}{X^*(k)} = \alpha D. \quad (8)$$

Hence, the IQ imbalance coefficient α can be estimated by utilizing the image to tone ratio and compensating for the distortion factor D.

In accordance with some embodiments, it may be preferable to compensate for 0<2δ<0.5 in this manner. However, for fractional bin delays larger than that (half a bin), various embodiments may start from the −k+1 bin to compensate for the smaller 1−2δ fractional offset.

Figure 5:
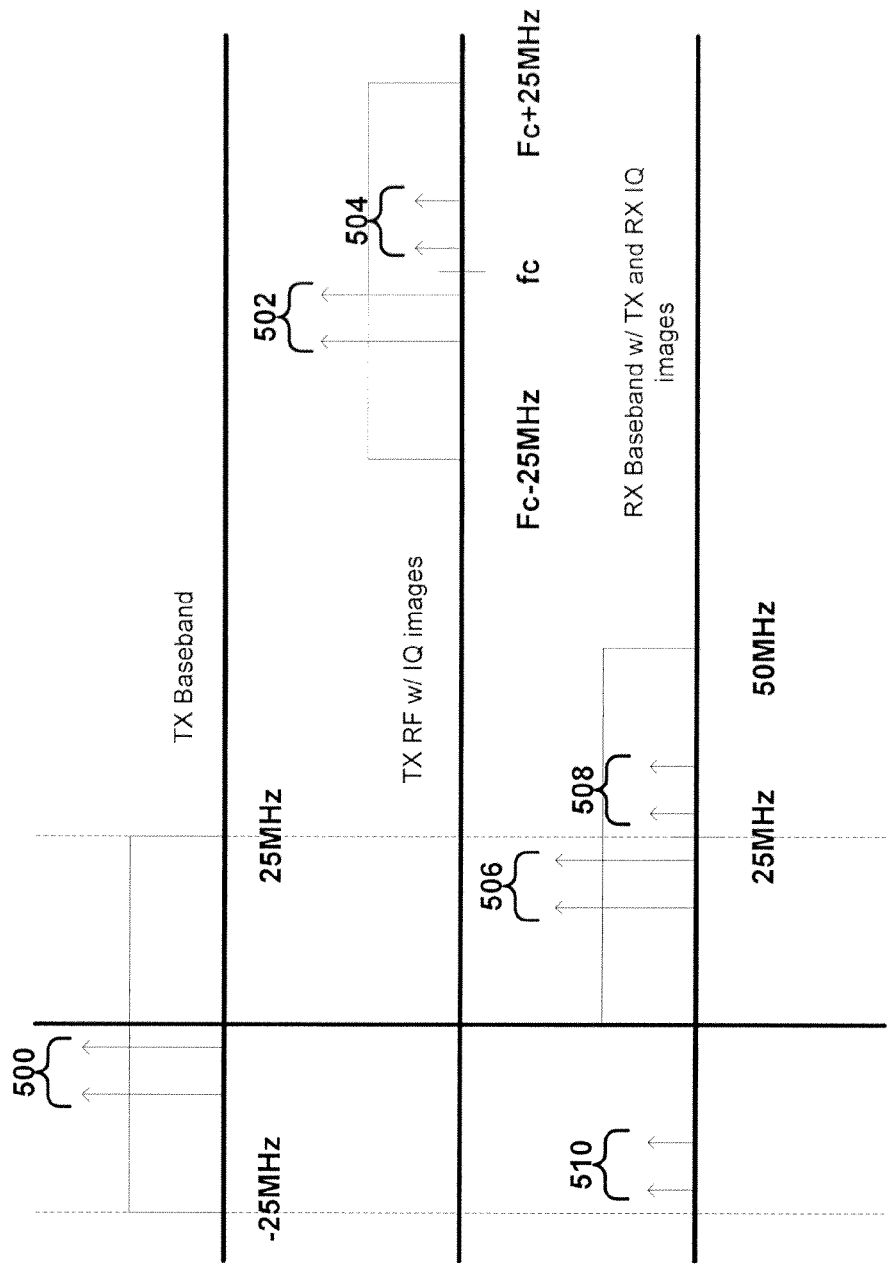
FIG. 5 is a diagram illustrating an exam IQ image frequency separation in a mixed network for estimating IQ imbalance in accordance with various embodiments.
Figure 6:
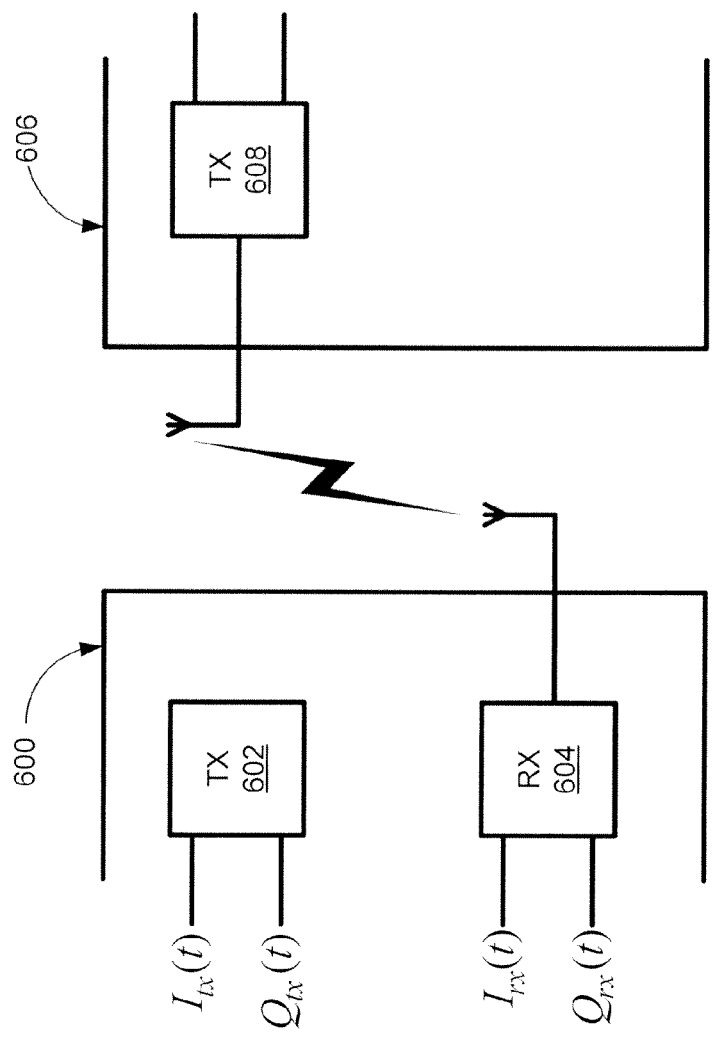
FIG. 6 is a schematic representation of first and second devices engaging in IQ imbalance estimation in accordance with various embodiments.

In a mixed MoCA network, calibration should be performed for both the 100 MHz and the 50 MHz IQ. That is, and when admitting (a new node) to a MoCA 2.0 NC, the above IQ algorithm is repeated using the MoCA 1.x receive configuration (i.e., with 50 MHz baseband filters engaged). FIG. 5 illustrates the resulting tones/signals and images in this case (e.g., transmitted tones 500, up-converted tones 502 and Tx IQ images 504, down-converted tones 506 and Tx IQ images 508 and Rx IQ images 510). When admitting to a MoCA 1.x NC. FIG. 6 remains applicable, but transmitted tones 500 are sent per a request for a Type II probe.

Referring to FIG. 6, various embodiments operate generally as follows. A first device 600 may include a transmitter 602 and a receiver 604. As described above, the effective sine and cosine waveforms performing up-conversion and down-conversion are never exactly orthogonal, nor are the time delay and gain. Accordingly, real-world systems will have some form of IQ imbalance. In accordance with various embodiments receiver 604 of first device 600 can request that an IQ probe be sent from another device, such as second, remote device 606, in particular, transmitter 608 of second device 606.

Figure 7:
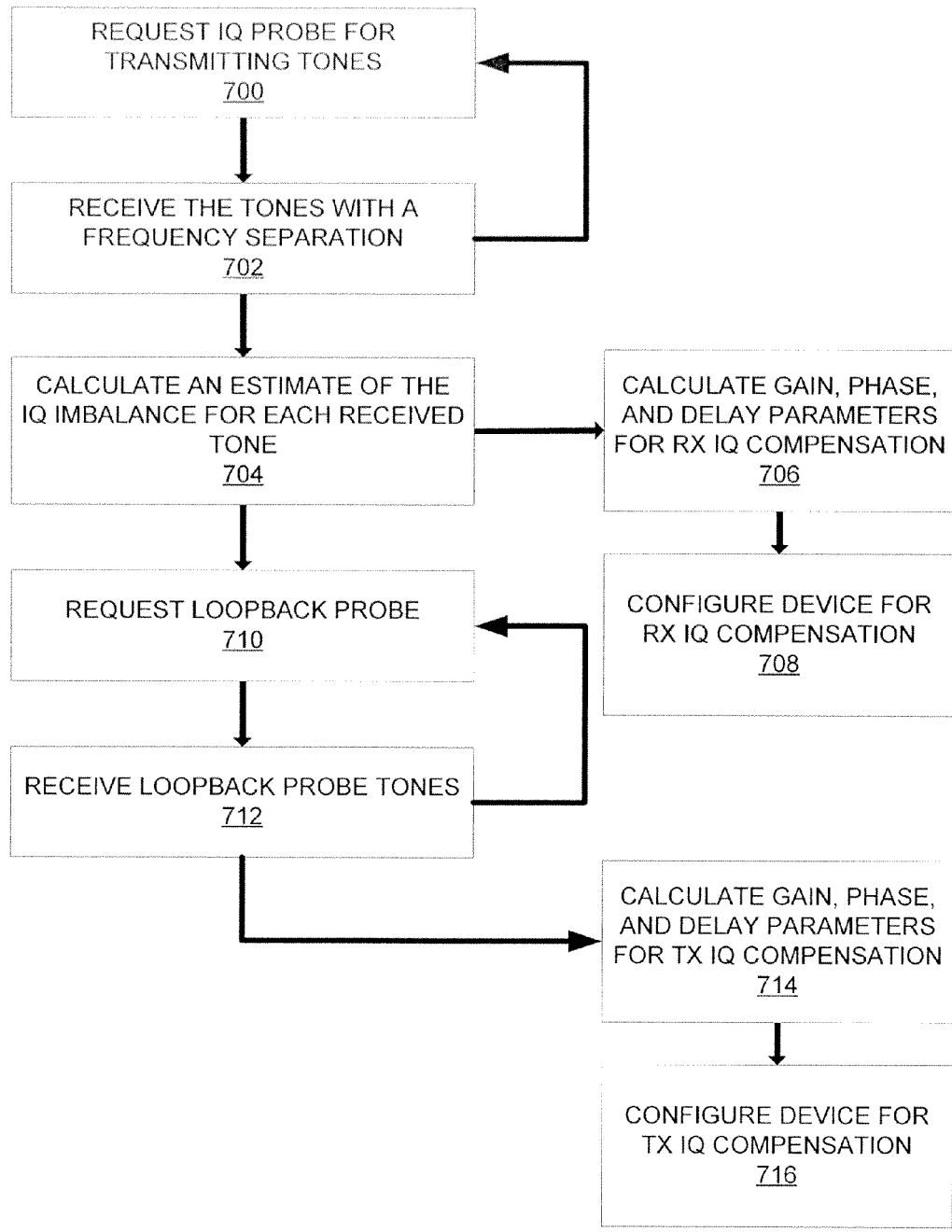
FIG. 7 illustrates example operations performed in accordance with various embodiments for estimating IQ imbalance.

FIG. 7 illustrates example operations performed in accordance with various embodiments for estimating (and compensating for) IQ imbalance. It should be noted that when a MoCA 2.0 New Node (NN) receives a valid Beacon, the NN examines whether the NC is a MoCA 1.x or MoCA 2.0 node. If the NC is a MoCA 2.0 node, the NN performs 100 MHz IQ calibration during admission.

At operation 700, an IQ probe is requested for transmitting tones. The IQ probe may be an RxIQ100 probe. It should be noted that during admission and prior to requesting an IQ probe, an NN requests multiple Error Vector Magnitude (EVM) probes, e.g., EVM100 probes. Upon receipt of the EVM probes, AGC, frequency offset (i.e., receiver mixer offset) and channel SNR are estimated. At operation 702, the tones sent in response to the IQ probe request are received with a frequency separation. The frequency separation may be set at 12.5 MHz (64 bins) or 25 MHz, for example. As described above, a first device may request the IQ probe from a second, remote device. Accordingly, a receiver of the first device is tuned in accordance with the frequency separation. At operation 704, the image to tone ratio based on the received tones are calculated.

It should be noted that operations 700-704 may be repeated for accuracy. That is, the first device may repeatedly request IQ probes, receive tones, and calculate the image to tone ratio in order to obtain an IQ imbalance sampling/sample set. At operation 706, I, Q, and D parameters are calculated for Rx IQ imbalance compensation. At operation 708, the first device (i.e., hardware) is configured for Rx IQ imbalance compensation. As described above, the receiver of the first device requests and receives tones transmitted by a transmitter of a second, remote device. Accordingly, the IQ imbalance estimated is relevant to the receiver of the first device.

In order to estimate Tx IQ imbalance, a loopback circuit may be formed with the receiver and the transmitter of the first device. As described previously, conventional systems and methods may rely on such a loopback configuration in order to self characterize IQ imbalance. Accordingly, to estimate Tx IQ imbalance, various embodiments may rely on conventional loopback estimation. One system and method of IQ imbalance estimation using loopback is disclosed in U.S. Patent Publication No. 2009/0325516 to Saeid Safavi, entitled "System and Method for IQ imbalance Estimation Using Loopback With Frequency Offset," and assigned to the assignee of the present disclosure, which is incorporated herein by reference in its entirety.

Referring back to FIG. 7, a loopback probe is requested at operation 710. That is, the receiver of the first device may request a loopback probe from the transmitter of the first device. At operation 712, the loopback probe tones are received. Similar to Rx IQ estimation described above, operations 710 and 712 may be repeated for accuracy. That is, upon requesting a plurality of loopback probes, and receiving a plurality of loopback probe tones, the results may be averaged. At operation 714, the I, Q, and D parameters for Tx IQ imbalance compensation. At operation 716, the first device is further configured for Tx IQ imbalance compensation.

It should be noted that once admission has been completed, the NN, if a MoCA 2.0 node, performs 50 MHz IQ calibration using a receiver-determined IQ probe during a link maintenance operation (LMO), as well as a loopback probe during LMO. 50 MHz IQ calibration is substantially similar to that described above, which is for 100 MHz IQ calibration.

That is, multiple EVM50 probes can be requested for estimating AGC, frequency offset, and channel SNR, while an RxIQ50 probe with desired tones is requested, and received with a 12.5 MHz frequency separation, and the image to tone ratio may be calculated. In some embodiments repeated IQ probe requests can be made, effectuating repeated receipt of multiple tones with the frequency separation. Image to tone ratio can be calculated for each receipt of the tones with frequency separation, and the results can be averaged. I, Q, and D parameters for Rx IQ imbalance compensation can be calculated, and the first device hardware can be configured accordingly. A loopback probe can be requested, effectuating the transmission of tones in order to estimate 50 MHz Tx IQ imbalance. Again, in some embodiments, this can be repeated to obtain an average result, after which I, Q, and D parameters can be calculated for 50 MHz Tx IQ imbalance compensation, where the first device can be configured to compensate for the 50 MHz Tx IQ imbalance.

If the NC is a MoCA 1.x NC, the NN performs 50 MHz IQ calibration during admission following the procedure defined in the MoCA 1.1 specification. When detecting a handoff/failover from MoCA 1.x NC to a MoCA 2.0 NC, each MoCA 2.0 node performs 100 MHz IQ calibration using a receiver-determined probe during LMO (for Rx IQ imbalance) and a loopback probe during LMO (for Tx IQ imbalance). In a mixed mode network, if 100 MHz IQ calibration has not yet been performed, a node may derive the 100 MHz IQ calibration parameters from the 50 MHz IQ calibration parameters and vice versa.

Figure 8A:
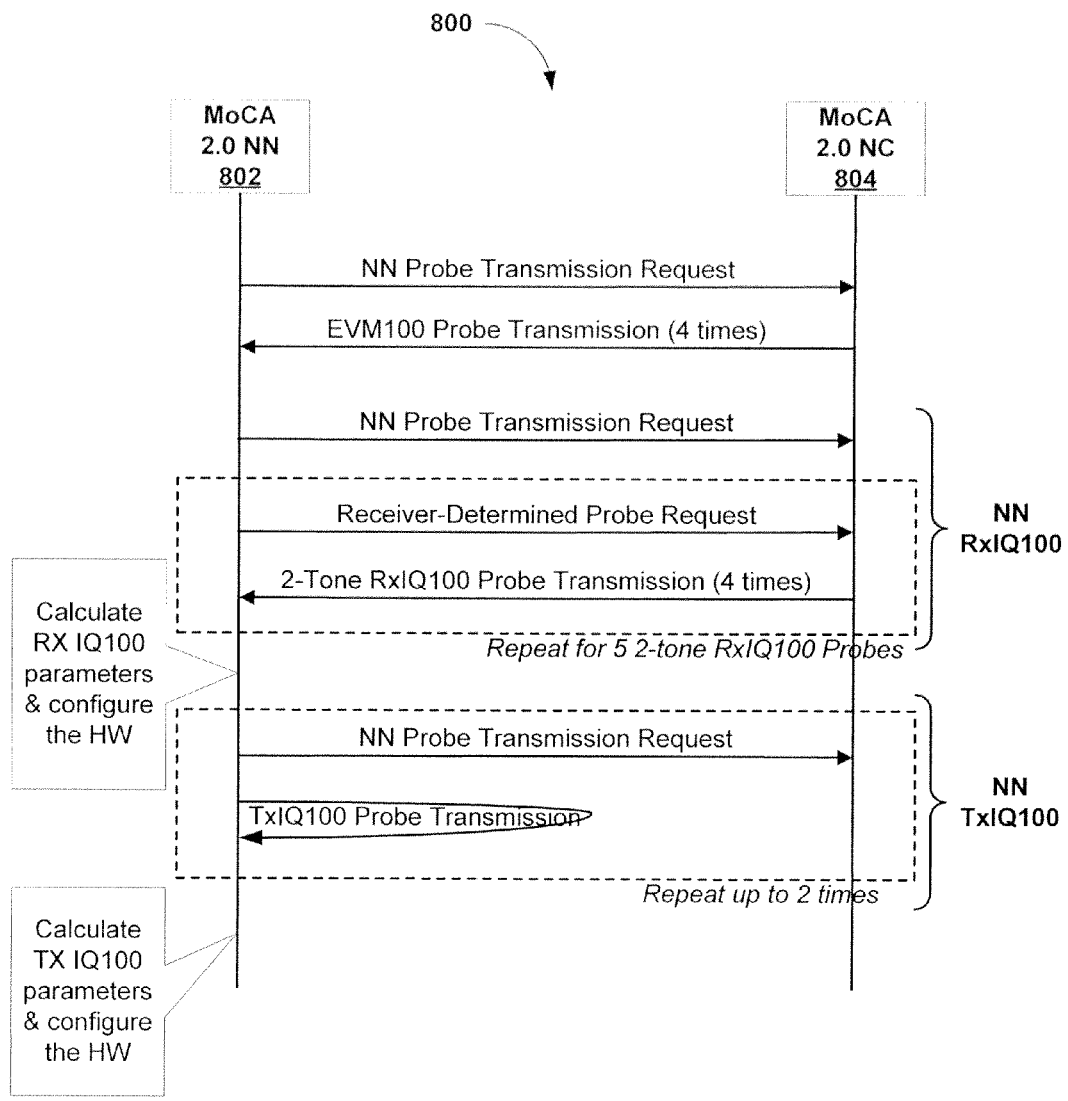
FIG. 8A is an example message flow diagram illustrating IQ imbalance estimation and calibration in accordance with various embodiments.

FIG. 8A is an example message flow diagram 800 illustrating the message flow between a MoCA 2.0 NN 802 and a MoCA 2.0 NC 804 during admission of the MoCA 2.0 NN in accordance with various embodiments. When a MoCA 2.0 NN is admitted by a MoCA 2.0 NC, the MOCA 2.0 NN performs 100 MHz IQ calibration in a "Begin Node Admission State" using "Probe Transmission Requests" (PTR) and "Receiver-Determined Probe" (RDP) Requests in "Admission Control Frame" (ACF) slots.

MoCA 2.0 NN 802 sends a PTR to MoCA 2.0 NC 804 to request ACF slots for, e.g., four EVM Probe transmissions. MoCA 20.0 NC 804 transmits an EVM probe four times. Upon receipt of the EVM100 probes, the MoCA 2.0 NN 802 estimates AGC, frequency offset and channel SNR. MoCA 2.0 NN 802 sends a PTR to MoCA 2.0 NC 804 to request ACF slots for, e.g., five, RDP requests and twenty RDP transmissions. At this point, the I, Q, and D parameters can be calculated to compensate for 100 MHz Rx IQ imbalance. Once MoCA 2.0 NC 804 schedules the ACF slot for the loopback probe transmission, MoCA 2.0 NN 802 sends a TxIQ100 probe. MoCA 2.0 NN 802 MAY request up to, e.g., three, loopback probes. Thereafter, I, Q, and D parameters for 100 MHz Tx IQ imbalance compensation can be calculated. Once MoCA 2.0 NN 802 finishes all the TxIQ100 probe transmissions, it sends a PTR with zero elements to inform MoCA 2.0 NC 804 that it has no more PTRs.

Figure 8B:
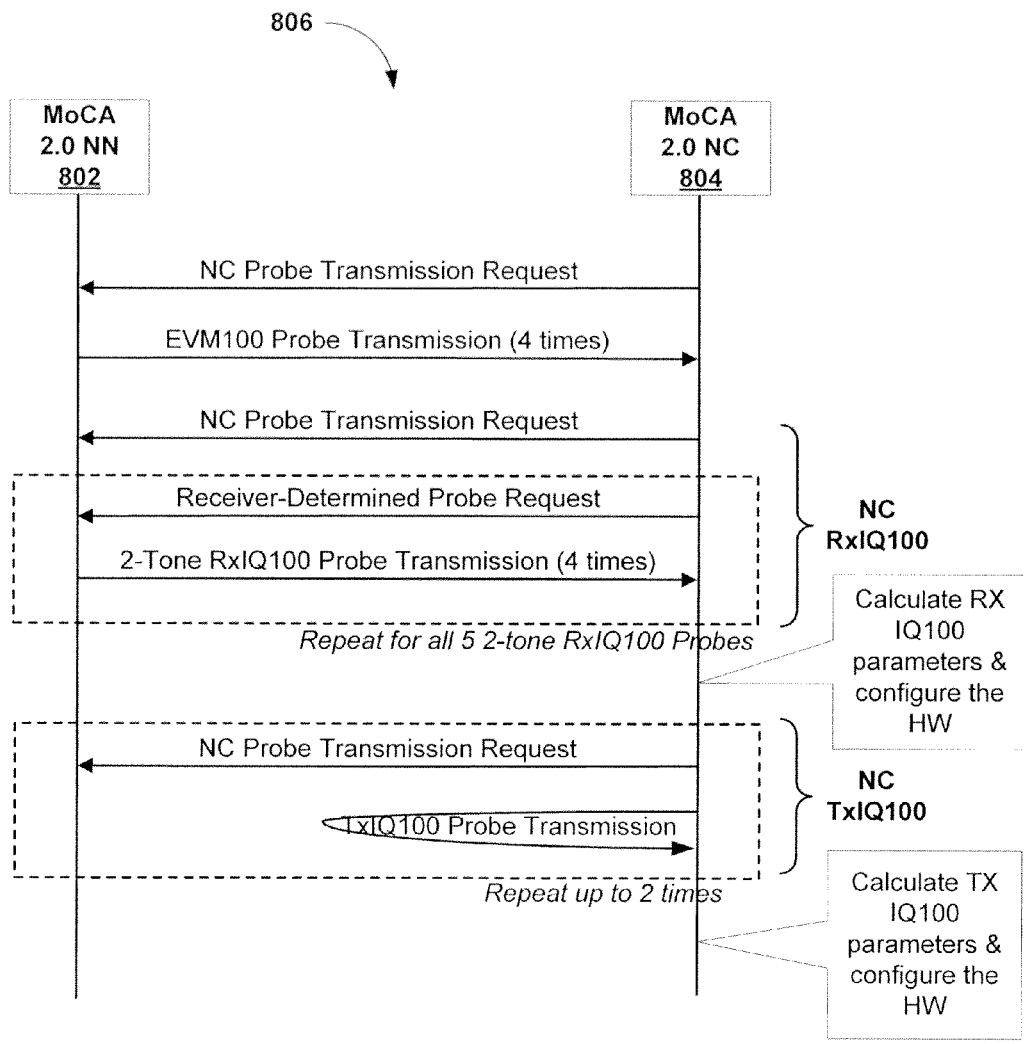
FIG. 8B is an example message flow diagram illustrating IQ imbalance estimation and calibration in accordance with various embodiments.

If MoCA 2.0 NN 802 is the second MoCA 2.0 node in the network, MoCA 2.0 NC 804 performs 100 MHz IQ calibration for itself after MoCA 2.0 NN 802 finishes its 100 MHz IQ calibration (as alluded to above). Otherwise, MoCA 2.0 NC 804 may optionally choose to perform 100 MHz IQ calibration. FIG. 8B illustrates an example message flow diagram 806 for 100 MHz IQ calibration of MoCA 2.0 NC 804 (which is similar to that for 100 MHz IQ calibration for MoCA 2.0 NN 802). That is, the message flow substantially mirror that of FIG. 8A, except that MoCA 2.0 NC 804 is the entity requesting probes, receiving probe transmissions, calculating I, Q, and D parameters, and configuring its hardware for 100 MHz IQ calibration/compensation.

As described previously, once MoCA 2.0 NN 802 finishes admission with a MoCA 2.0 NC, e.g., MoCA 2.0 NC 804, (and becomes an existing node (EN)) it performs 50 MHz IQ calibration by requesting an RDP LMO followed by a loopback probe LMO. In the RDP LMO, the MoCA 2.0 EN 802 may choose any other MoCA 2.0 node as the probe-transmitting node, although it is preferable that MoCA 2.0 EN 802 chooses a node that has the best 100 MHz unicast bitloading associated with it.

Figure 8C:
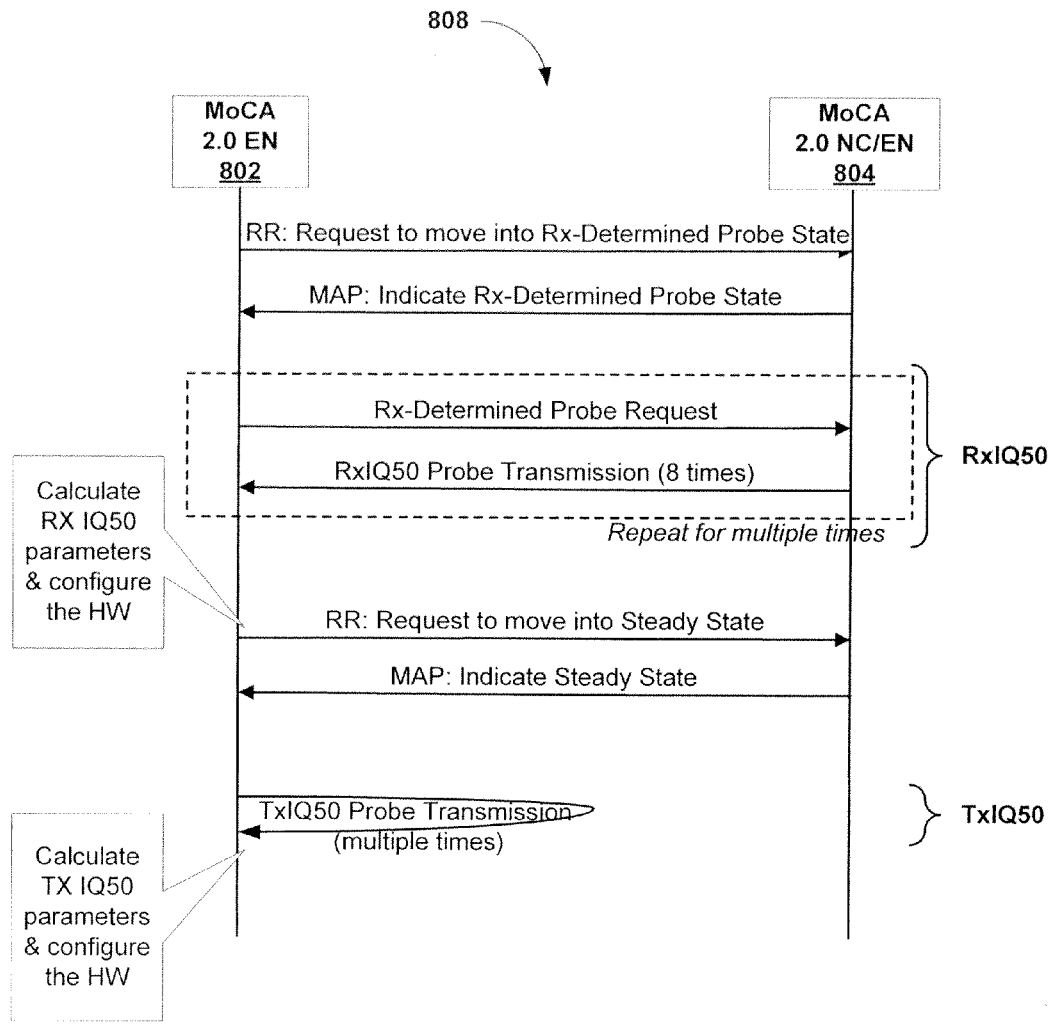
FIG. 8C is an example message flow diagram illustrating IQ imbalance estimation and calibration in accordance with various embodiments.

FIG. 8C illustrates an example message flow diagram 808 illustrating messages exchanged between MoCA 2.0 EN 802 and MoCA 2.0 NC/EN 804. Once MoCA 2.0 NC 804 changes the LINK_STATE_II to Receiver-Determined Probe State from Steady State, MoCA 2.0 EN 802 transmits a RDP request to specify the key parameters used to create the RxIQ50 probes. The tone location of RXIQ 50 probes can be derived from the measurements of EVM100 Probes transmitted during admission. After receiving, e.g., eight, RxIQ50 probes, the MoCA 2.0 EN 802 may request additional RxIQ50 probe transmissions. Generally, MoCA 2.0 EN 802 receives three sets of eight RxIQ50 probes. If the RDP LMO is not completed successfully, e.g., it is aborted due to node admission or timeout, MoCA 2.0 EN 802 can request another RDP LMO when the link state is back to Steady State. After the RDP LMO is completed successfully, MoCA 2.0 EN 802 requests a loopback probe transmission for the TxIQ50 probe. The duration of each loopback probe is TC TIME SLOTs (i.e., the duration of Type C probes in MoCA 1.1). MoCA 2.0 EN 802 may request multiple additional loopback probes.

It should be noted that when a MoCA 2.0 NN is admitted by a MoCA 1.x NC, the moCA 2.0 NN follows the MoCA 1.x node admission procedure specified in the MoCA 1.1 specification for IQ50 tuning.

Figure 8D:
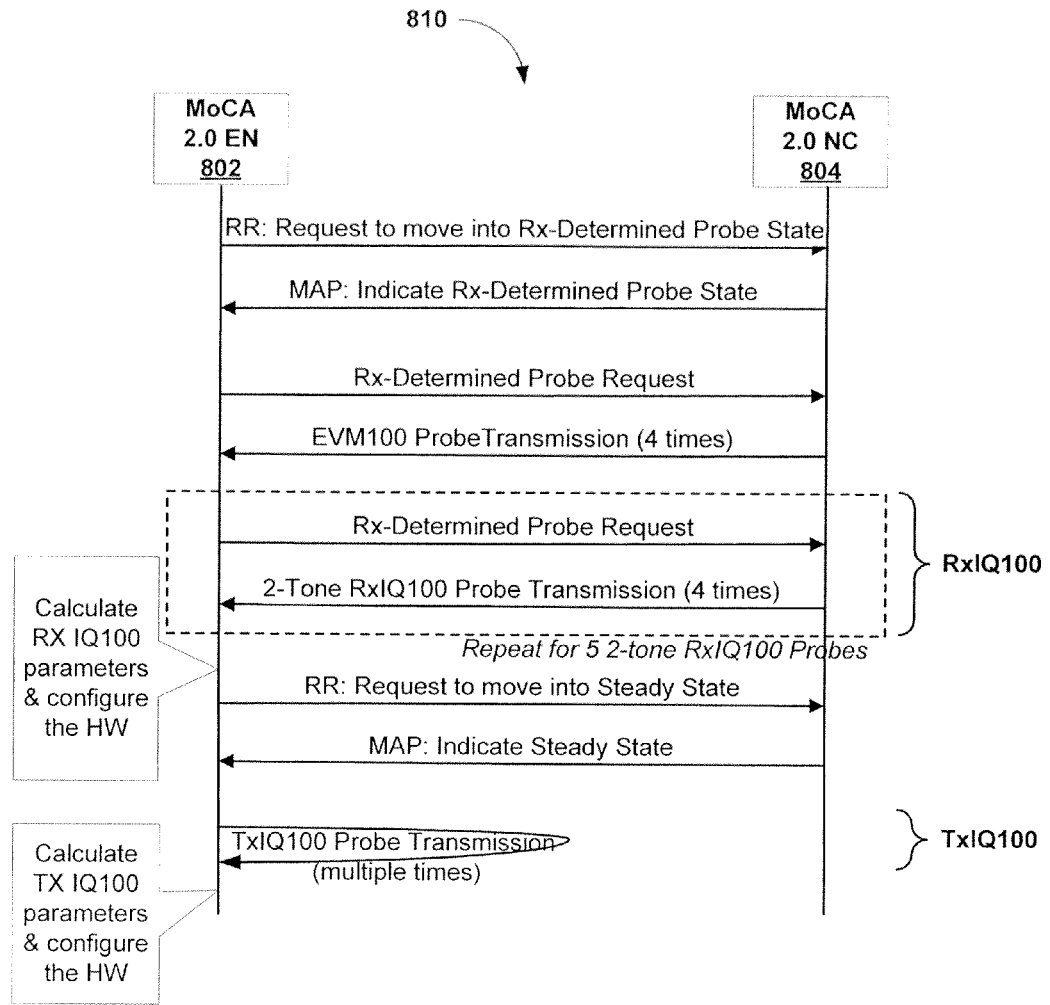
FIG. 8D is an example message flow diagram illustrating IQ imbalance estimation and calibration in accordance with various embodiments.

FIG. 8D illustrates an example message flow diagram 810 between MoCA 2.0 NN 802 and MoCA 2.0 NC 804 when a MoCA 2.0 EN becomes the NC after a handoff or failover from a MoCA 1.x NC. Each MoCA 2.0 node (including the NC) performs 100 MHz IQ calibration by requesting a RDP LMO and a loopback probe LMO. The RDP LMO and the loopback probe LMO may be requested after the node finishes its first regular LMO after handoff/failover.

Again, a MoCA 2.0 node may choose any other MoCA 2.0 node as the probe-transmitting node, although it is preferable that the MoCA 2.0 node chooses another MoCA 2.0 node that has the best 100 MHz unicast bitloading to it. As illustrated in FIG. 8D, once MoCA 2.0 NC 804 changes the LINK_ STATE_II to Receiver-Determined Probe State from Steady State, the MoCA 2.0 EN 802 transmits a RDP Request to request four EVM100 probes. The EMV100 Probe is specified using the EVM Probe request element. After receiving the EVM100 probes from MoCA 2.0 NC 804, MoCA 2.0 EN 802 transmits another RDP request to request four 2-tone RxIQ100 probes. MoCA 2.0 EN 802 repeats the RDP request and RDPs for all 5 2-tone RxIQ100 probes. If the RDP LMO is not completed successfully, e.g., aborted due to node admission or timeout, MoCA 2.0 EN 802 may request another RDP LMO after the link state returns to Steady State. After the RDP LMO is completed successfully, MoCA 2.0 EN 802 requests a loopback probe transmission for the TxIQ100 probe. The request/transmission process may be repeated multiple times.

When a MoCA 2.0 NC admits the first MoCA 1.x node to the network, it follows the MoCA 1.x node admission procedure specified in the MoCA 1.1 specification for IQ50 tuning.

MoCA 1.x Type II (also referred to as MoCA 1.x RX IQ) probe packets may include two tones located at sufficient frequency spacing with sufficient SNR. The locations of the two tones (SC1 and SC2) are defined in the MoCA 1.x specification as follows. RXIQ100 calibration shall be performed via five RDPs, where each RDP consists of two tones. The receiver will have 10 image to tone ratios computed (5×2 tones) at the end of this process. The two tones shall be picked similarly to MOCA 1.x Type II probe tone locations that is based on high SNR. Five IQ segments indicative of RxIQ100 transmit tone locations may be provided by an RF systems group for tone selection of RXIQ100.

The first step in transmit tone selection is determining the bins with the highest SNR that are within the bands defined per the aforementioned five IQ segments. New Node Type I (EVM) Probe during node admission stage may be used for this purpose. The EVM probe data can consist of 16 bits pseudo floating number and is converted to SNR. Once the EVM data is converted to SNR in, e.g., log 2 format, the bin with highest SNR can be selected. The receiving node's LO frequency may be shifted (to achieve frequency separation) by +12.5 MHz (64 bins). Accordingly, the tone and image locations for the receiving node can be computed. It should be noted the amount of frequency separation implemented in accordance with various embodiments can vary. It should be noted that a bin shifting algorithm may be utilized to account for large frequency offsets that would cause tones to shift into neighbor bins. The highest frequency offset in terms of Hz can be computed as 1600 MHz*200 ppm=320 KHz which will cause the tone to shift by 2 bins. Time domain frequency offset estimation status can be converted to Hz as well. In accordance with one embodiment the bins of the tones and images (e.g., a total of 4) can be set to I on the Rx bitloading table of the receiving node, while all the other bins may be set to 0. Tone selection for MoCA 2.0 TX IQ probes can be based on, e.g., a proprietary selection algorithm.

Regarding the computation (averaged) of image to tone ratio, in one example, TX tone locations are picked at bins 420 and 495, while the frequency separation between the nodes is 150 ppm (in the case of a MoCA 1.x Type II probe). Upon successful acquisition of a MoCA 1.x RX IQ probe; the Rx IQ probe data is saved to the shared memory using direct memory access. This data may include 160 32-bit fields (2 tones*2 images*40 symbols). A similar operation may be performed for MoCA 2.0 Rx IQ probes, but repeated five times for a total of 10 image to tone ratios that are computed from each RDP. After the accumulation of image to tone ratios, RX IQ coefficients can be computed.

Figure 9:
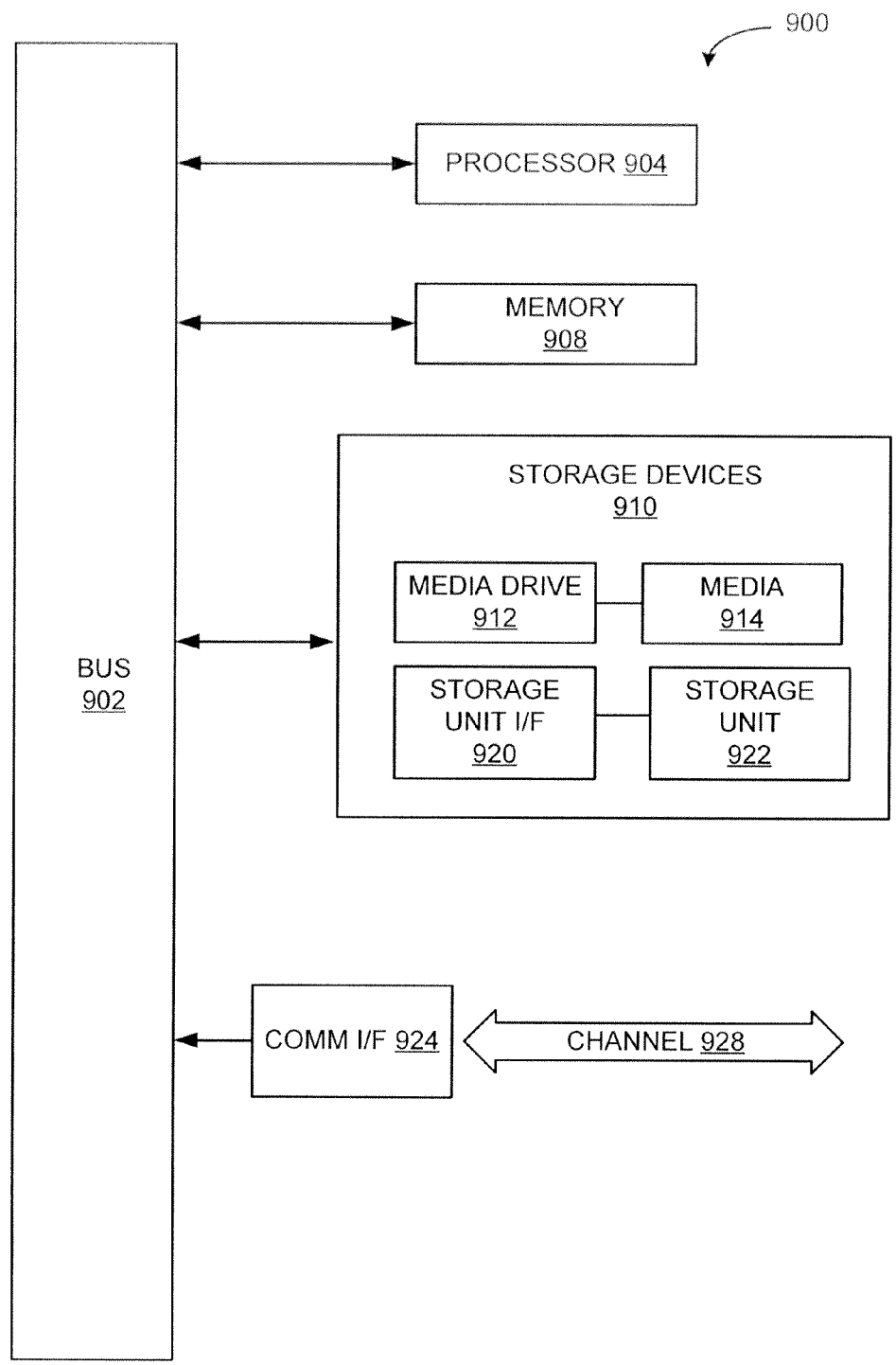
FIG. 9 is an example of a computing module that can be used in conjunction with various embodiments.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In some implementations, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 9. Various embodiments are described in terms of this example-computing module 900. After reading this description, it will become apparent to a person skilled in the relevant art how to implement the application using other computing modules or architectures.

Referring now to FIG. 9, computing module 900 may represent, for example, computing or processing capabilities found within a desktop, laptop, notebook, and tablet computers; hand-held computing devices (tablets, PDA's, smart phones, cell phones, palmtops, etc.); workstations or other devices with displays; servers; set top boxes, smart TVs or other networked home appliances; or any other type of special-purpose or general-purpose computing devices as may be desirable or appropriate for a given application or environment. Computing module 900 might also represent computing capabilities embedded within or otherwise available to a given device. For example, a computing module might be found in other electronic devices such as, for example navigation systems, portable computing devices, and other electronic devices that might include some form of processing capability.

Computing module 900 might include, for example, one or more processors, controllers, control modules, or other processing devices, such as a processor 904. Processor 904 might be implemented using a general-purpose or special-purpose processing engine such as, for example, a microprocessor, controller, or other control logic. In the illustrated example, processor 904 is connected to a bus 902, although any communication medium can be used to facilitate interaction with other components of computing module 900 or to communicate externally.

Computing module 900 might also include one or more memory modules, simply referred to herein as main memory 908. For example, preferably random access memory (RAM) or other dynamic memory, might be used for storing information and instructions to be executed by processor 904. Main memory 908 might also be used for storing temporary variables or other intermediate information during execution of instructions to be executed by processor 1004. Computing module 900 might likewise include a read only memory ("ROM") or other static storage device coupled to bus 902 for storing static information and instructions for processor 904.

Computing module 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid state drive, a magnetic tape drive, an optical disk drive, a CD or DVD drive (R or RW), or other removable or fixed media drive might be provided. Accordingly, storage media 914 might include, for example, a hard disk, an integrated circuit assembly, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing module 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory module) and memory slot, a PCMCIA slot and card, and other fixed or removable storage units 922 and interfaces 920 that allow software and data to be transferred from the storage unit 922 to computing module 900.

Computing module 900 might also include a communications interface 924. Communications interface 924 might be used to allow software and data to be transferred between computing module 900 and external devices. Examples of communications interface 924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other comnnunications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

While various embodiments of the disclosed method and apparatus have been described above, it should be understood that they have been presented by way of example only, and not of limitation. Likewise, the various diagrams may depict an example architectural or other configuration for the disclosed method and apparatus, which is done to aid in understanding the features and functionality that can be included in the disclosed method and apparatus. The disclosed method and apparatus is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed method and apparatus, whether or not such embodiments are described and whether or not such features are presented as being a part of a described embodiment. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not bhe construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method, comprising:
requesting an IQ probe for transmitting tones;
receiving the tones with a frequency separation between images of the tones as a result of a frequency shift at a requestor of the IQ probe; and
calculating an estimate of the IQ imbalance for each received tone.

2. The method of claim 1, further comprising calculating gain, phase, and delay parameters to compensate for the IQ imbalance.

3. The method of claim 2, wherein the IQ imbalance comprises a receiver IQ imbalance.

4. The method of claim 1, further comprising requesting a loopback probe for transmitting tones in a loopback circuit including a receiver and transmitter of a radio device.

5. The method of claim 4, further comprising receiving the tones transmitted via the loopback probe, and calculating gain, phase, and delay parameters to compensate for transmitter IQ imbalance.

6. The method of claim 1, wherein the estimated IQ imbalance includes a gain imbalance.

7. The method of claim 1, wherein the estimated IQ imbalance includes a phase imbalance.

8. The method of claim 1, wherein the estimated IQ imbalance estimate includes a delay imbalance.

9. The method of claim 1, wherein the frequency separation is selected as being large enough so that transmitter and receiver images of the transmitted tones do not interfere with each other.

10. The method of claim 1, wherein the frequency separation comprises 12.5 MHz.

11. The method of claim 1, wherein the IQ probe is requested by a first device having at least a receiver, and the tones are transmitted by a second device, remotely located from the first device, the second device having at least a transmitter.

12. The method of claim 11, wherein the first device comprises a MoCA 2.0 new node (NN) undergoing admission, and the second device comprises a MoCA 2.0 network controller (NC).

13. The method of claim 11, wherein the first device comprises a MoCA 2.0 existing node (EN), and the second device comprises at least one of a MoCA 2.0 NC or another MoCA 2.0 EN.

14. A method, comprising:
requesting an IQ probe for transmitting tones;
receiving the tones with a frequency separation; and
calculating an estimate of the IQ imbalance for each received tone by calculating the image to tone ratio based on the received tones.

15. The method of claim 14, further comprising repeating the requesting of the IQ probe, the receiving of the tones, and the calculating of the image to tone ratio, and averaging the results of the calculations of the image to tone ratio.

16. A communication device comprising:
a non-transitory memory configured to store instructions;
a processor, operatively coupled to the memory and configured to execute instructions, the instructions causing the processor to:
request an IQ probe for transmitting tones;
receive the tones with a frequency separation between images of the tones as a result of a frequency shift at a requestor of the IQ probe; and
calculate an estimate of the IQ imbalance for each received tone.

17. The communication device of claim 16, wherein the IQ imbalance comprises an IQ imbalance associated with a receiver of the communication device.

18. The communication device of claim 16, wherein the instructions further cause the processor to request a loopback probe for transmitting tones in a loopback circuit including a receiver and transmitter of the communication device.

19. The communication device of claim 18, wherein the instructions further cause the processor to receive the tones transmitted via the loopback probe, and calculate gain, phase, and delay parameters to compensate for transmitter IQ imbalance.

20. The communication device of claim 16, wherein the frequency separation is selected as being large enough so that transmitter and receiver images of the transmitted tones do not interfere with each other.

21. The communication device of claim 16, wherein the request for the IQ probe is transmitted to a remote communication device during admission of the communication device to a network.

* * * * *